US012569975B2

(12) United States Patent
Seybold et al.

(10) Patent No.: US 12,569,975 B2
(45) Date of Patent: Mar. 10, 2026

(54) MACHINE TOOL HAVING A PARAMETERIZING INTERFACE

(71) Applicant: Festool GmbH, Wendlingen (DE)

(72) Inventors: Matthias Seybold, Deizisau (DE); Christoph Martin Single, Frickenhausen (DE); Steffen Wandel, Pliezhausen (DE)

(73) Assignee: Festool GmbH, Wendlingen (DE)

( * ) Notice: Subject to any disclaimer, the term of this patent is extended or adjusted under 35 U.S.C. 154(b) by 151 days.

(21) Appl. No.: 18/275,037

(22) PCT Filed: Feb. 3, 2022

(86) PCT No.: PCT/EP2022/052614
§ 371 (c)(1),
(2) Date: Jul. 31, 2023

(87) PCT Pub. No.: WO2022/171519
PCT Pub. Date: Aug. 18, 2022

(65) Prior Publication Data

US 2024/0100678 A1 Mar. 28, 2024

(30) Foreign Application Priority Data

Feb. 12, 2021 (DE) ..................... 10 2021 103 418.3
Mar. 18, 2021 (DE) ..................... 10 2021 106 710.3

(51) Int. Cl.
*B25F 5/02* (2006.01)
*B25F 5/00* (2006.01)

(52) U.S. Cl.
CPC ................ *B25F 5/02* (2013.01); *B25F 5/001* (2013.01)

(58) Field of Classification Search
CPC ........................................................ B25F 5/02
See application file for complete search history.

(56) References Cited

U.S. PATENT DOCUMENTS

2015/0135306 A1* 5/2015 Winkler .................. G06F 12/00 726/17
2016/0311094 A1 10/2016 Mergener et al.
(Continued)

FOREIGN PATENT DOCUMENTS

CN 111132803 A 5/2020
DE 10 2008 020 173 A1 10/2009
(Continued)

OTHER PUBLICATIONS

International Search Report.
German Search Report.
Chinese First Office Action dated May 28, 2025.

*Primary Examiner* — Daniel Jeremy Leeds
(74) *Attorney, Agent, or Firm* — Hoffmann & Baron, LLP

(57) ABSTRACT

A machine tool in the form of a hand-held power tool or a semi-stationary machine tool, the machine tool having a tool holder for holding a work tool, a drive motor for driving the tool holder and at least one electrical function unit, the machine tool having a control device for actuating the at least one electrical function unit using at least one actuation function, the at least one electrical function unit being designed to perform an output function depending on the actuation by the at least one actuation function, and the machine tool having at least one operation element, which can be moved by an operator of the machine tool between a first operation element position and at least one second operation element position to actuate the control device. The machine tool has a parameterizing interface, via which at least one allocation parameter can be parameterized for allocation of the at least one operation element and the first operation element position and/or the at least one second operation element position to the at least one actuation function.

24 Claims, 6 Drawing Sheets

(56) References Cited

U.S. PATENT DOCUMENTS

| | | | | |
|---|---|---|---|---|
| 2016/0342151 | A1* | 11/2016 | Dey, IV | G06F 3/04817 |
| 2018/0354114 | A1 | 12/2018 | Bantle et al. | |
| 2019/0070720 | A1* | 3/2019 | Rabe | B25F 5/001 |
| 2021/0069885 | A1 | 3/2021 | Huggenberger | |
| 2021/0360775 | A1* | 11/2021 | Smith | B25F 5/006 |

FOREIGN PATENT DOCUMENTS

| | | | |
|---|---|---|---|
| DE | 10 2012 221 997 | A1 | 11/2013 |
| DE | 10 2015 211 700 | A1 | 12/2016 |
| DE | 10 2015 226 084 | A1 | 6/2017 |
| DE | 10 2016 204 629 | A1 | 9/2017 |
| EP | 3 202 537 | B1 | 6/2019 |
| FR | 3 087 691 | A1 | 5/2020 |

* cited by examiner

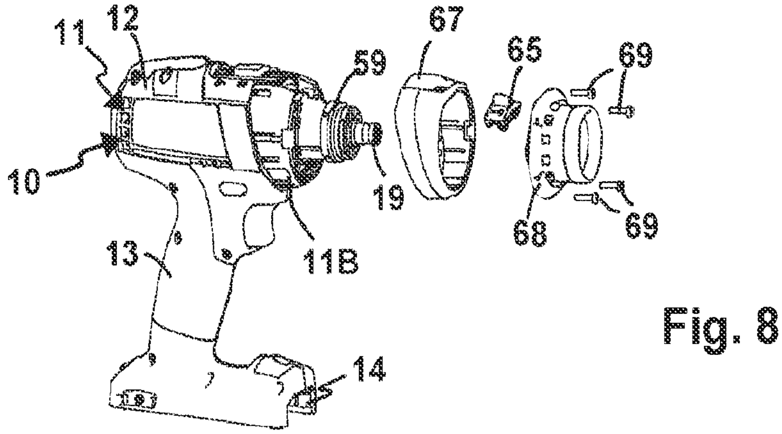
Fig. 8
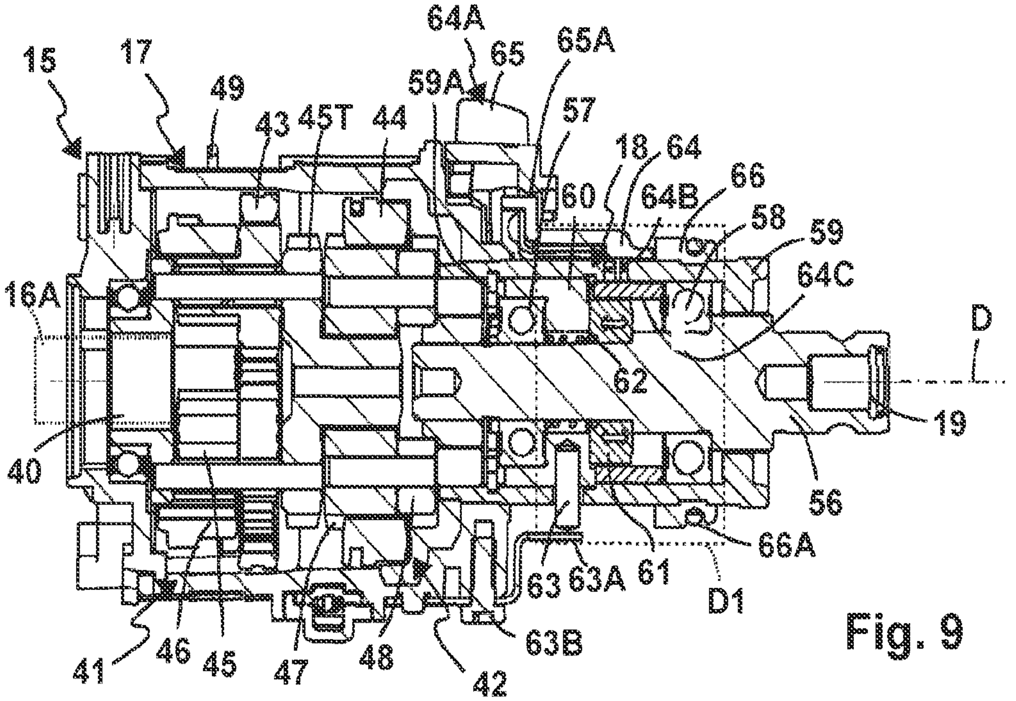
Fig. 9
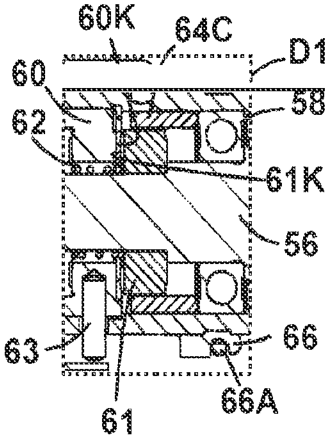
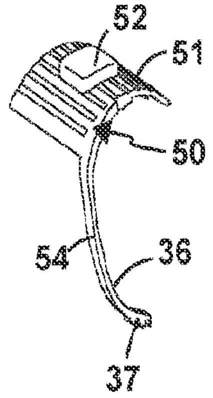
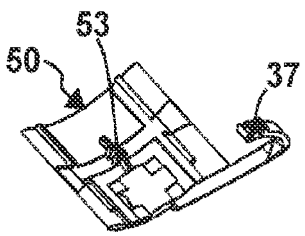
Fig. 10
Fig. 11
Fig. 12

MACHINE TOOL HAVING A PARAMETERIZING INTERFACE

This application is a National Stage application based on International Application No. PCT/EP2022/052614, filed Feb. 3, 2022, which claims priority to DE 102021103418.3, filed Feb. 12, 2021 and DE 102021106710.3, filed Mar. 18, 2021.

BACKGROUND OF THE INVENTION

The invention relates to a machine tool in the form of a hand-held power tool or a semi-stationary machine tool, the machine tool having a tool holder for holding a work tool and a drive motor for driving the tool holder and at least one electric function unit, the machine tool having a control device for actuating the at least one electric function unit using at least one actuation function, the at least one electric function unit being designed to perform an output function depending on the actuation by the at least one actuation function, and the machine tool having at least one operating element which can be moved by an operator of the machine tool between a first operating element position and at least one second operating element position to actuate the control device.

Such a machine tool is a screwing machine, a sawing machine, a grinding machine or the like, for example. The control device for example actuates the drive motor on the basis of the actuation function to drive the tool holder, thus realising an output function. A work tool, e.g. a drill, a saw blade or the like, is or can be located at the tool holder. It is also possible, however, although not in every case, that the respective operating element is ergonomically accessible to an operator.

SUMMARY OF THE INVENTION

The invention is therefore based on the problem of providing an improved machine tool.

To solve the problem, it is provided in a machine tool of the type mentioned at the beginning that the machine tool has a parameterising interface via which at least one allocation parameter can be parameterised for allocation of the at least one operating element and the first operating element position and/or the at least one second operating element position to the at least one actuation function, such that, when the at least one operating element is moved into the first or the at least one second operating element position, the control device actuates the at least one function unit using the at least one actuation function.

The machine tool is a hand-held power tool in particular, preferably a screwing machine or a drilling machine. The machine tool may also be a semi-stationary machine tool, however, for example a saw which can be transported to a point of use, for example a compound mitre saw, a bench saw or the like. Generally for the record, the machine tool can be a drilling machine, screwing machine, sawing machine, grinding machine or the like.

A hand-held power tool is for example operated forwards in a working direction when machining a workpiece, for example when drilling, screwing, sawing or the like, so that the work tool can engage with a workpiece or with a screw at a forward operation of the hand-held power tool along the working direction.

The control device for example comprises at least one processor for executing at least one control programme to actuate the at least one function unit.

An electric function unit for example comprises the drive motor and/or other components of a drive train for driving the tool holder.

Another function unit for example comprises an illumination means and/or an illumination device for illuminating a working area of the machine tool. In this case the output function is an illumination, for example.

The function unit can furthermore comprise the visual and/or audible output of functional states of the machine tool. In this case the output function is then a status message and/or a warning message, for example.

The function unit can also comprise a safety device, for example for braking the tool holder in hazardous or safety-relevant situations. In this case the output function is then an emergency shut-down of the drive motor and/or a braking of the tool holder, for example.

It is a fundamental idea of the present invention that the operating element can be configured as it were. Using the at least one allocation programme, a functional allocation can be set and/or configured between the operating element and its operating element positions and the actuation function(s) of the control device, which allocation can be triggered or actuated by operating the operating element.

Depending on the allocation parameter, at least one actuation function can be selected or triggered by moving the operating element into the first operating element position or the at least one second operating element position.

With the at least one allocation parameter, the operating element can be activatable, as it were, by allocating at least one actuation function to the operating element. Using the at least one allocation parameter, an operating element can easily be parameterised to be inactive, as it were, or rendered inoperative, by not allocating an actuation function to the operating element. In this case an operation of the operating element does not result in triggering the actuation function.

The control device controls the respective electric function unit using one or more actuation functions. Which of the actuation functions is used by the control device, however, can be set by means of the parameterisation of the at least one operating element or of several operating elements of the machine tool. The control device advantageously has, for providing the respective actuation function, one or more control programmes which can be executed by a processor of the control device and/or which are stored in a memory of the control device.

The operating element can be a switch, for example. A switch allocation of said switch can be set using the at least one allocation parameter, for example.

The switch can thus for example be provided for switching an illumination device or illumination means of the machine tool on or off depending on the at least one allocation parameter. The output function then comprises the output of light, for example If the at least one allocation parameter is parameterised differently, however, the switch can be provided for operating another output function, for example for limiting a motor speed, for setting a torque or the like.

Yet even if predetermined output functions are linked to the operating element, e.g. the switch, an alternative allocation of the at least one actuation function to operating element positions of the switch, e.g. switch positions, is advantageous.

The operating element can for example be exclusively provided for changing a direction of rotation of the drive motor. By means of the at least one allocation parameter, it is however possible to allocate the first operating element position to a clockwise rotation and the second operating element position to an anticlockwise rotation of the drive motor or, vice versa, to allocate the first operating element position to an anticlockwise rotation and the second operating element position to a clockwise rotation of the drive motor. An operator can consequently adjust the operating element and its respective operating element positions optimally to meet requirements.

Advantageously at least one ergonomic property of the operating element can be adjusted or parameterised by means of the at least one allocation parameter. The ergonomic property can for example be a respective switching position of an operating element designed as a switch, in particular a relative position of the operating element with respect to a machine housing of the machine tool in the respective first or second operating element position. The ergonomic property may also be for example, however, that a respective actuation function can be allocated to an operating element that is easily accessible for an operator of the machine tool using the at least one allocation parameter.

It should be mentioned that the at least one allocation parameter can be a part of a parameter set. The at least one allocation parameter can for example be a part of an allocation table or an allocation array.

The control device advantageously has a memory for storing the at least one allocation parameter. An allocation table, in particular a kind of lock-up table, with one or several allocation parameters is stored in the memory, for example. The memory for storing the at least one allocation parameter is preferably a non-volatile memory, e.g. a flash memory, an EEPROM or the like.

It is advantageously provided that the at least one actuation function comprises a first actuation function and a second actuation function, wherein, by way of the parameterisation interface, the at least one allocation parameter can be parameterised for allocating the first operating element position to the first actuation function and the second operating element position to the to the second actuation function or for allocating the first operating element position to the second actuation function and the second operating element position to the to the first actuation function. The first actuation function may for example be provided for actuating the drive motor for clockwise rotation and the second actuation function for actuating the drive motor for anticlockwise rotation. Using the at least one allocation parameter, it can thus be set whether the drive motor is operated clockwise or anticlockwise in the first operating element position.

It is furthermore advantageous if the machine tool has a first operating element and a second operating element and, using the at least one allocation parameter, at least one actuation function of the control device can be allocated to the first operating element and/or to the second operating element. The operator can thus for example link the first or second operating element to the at least one actuation function which is most suitable in ergonomic terms. The first operating element is for example located on a first side of the machine tool or its machine housing and the second operating element on a second side of the machine tool or its machine housing, which is in particular different from the first side. Using the at least one allocation parameter, the operator can allocate the actuation function to the first or the second operating element, for example to switch an electric function unit in the form of an illumination device or illumination means on or off.

It is advantageously provided that the at least one operating element comprises or is represented by a switching element which can be moved mechanically between the first and the second operating element position, in particular displaced in a linear fashion, in particular for setting the direction of rotation of the drive motor. The switching element for example comprises an operating element body or switching element body with an operating area which can be operated by the operator. The switching element may be a pushbutton or a slide switch, for example. It is easily possible as well, however, that the switching element is mounted so as to be rotatable with respect to a machine housing of the machine tool. With such a rotary switching element, a maximum speed or set speed of the drive motor can be set, for example.

One exemplary embodiment may provide that the at least one operating element, in particular if designed as a switching element, is located in the region of a handle of the machine tool provided for gripping or encompassing by an operator.

The handle is advantageously designed to resemble a pistol. The handle is a pistol-type handle or a pistol grip, for example.

The operator can for example grip the handle with one hand, e.g. with the right hand or the left hand.

It is advantageously provided that the operating element, in particular the switching element, projects in one of the operating element positions, in particular of the switch or switching element, into or in front of a first gripping area provided for encompassing with a right hand of the operator, and in the other operating element position, in particular of the switch or switching element, into or in front of a second gripping area provided for encompassing with a left hand of the operator. The second gripping area differs from the first gripping area. The first and the second gripping areas are for example facing or allocated to an inner surface of the right or left hand, if the respective right or left hand encompasses or grips the handle. The second gripping area and the first gripping area are for example located on opposite or mutually angled sides of the handle. It is possible that the at least one operating element, in particular the switching element, projects to different extents in front of the first and second gripping areas in the respective operating element positions. It is also possible that the at least one operating element, in particular the switching element, projects farther in front of a respective gripping area in one of the operating element positions than in the other operating element position. In this operating element position the operating element can be in alignment with the gripping area or set behind the gripping area.

The gripping area for example comprises a section against which an index finger or thumb of the operator rests or can rest when encompassing the handle and/or which can be gripped by the thumb or index finger of the operator when encompassing the handle. The gripping area should therefore be understood in such a way that the palm of the operator does not encompass the section of the gripping area where the operating element is located and in front of which the operating element can project, but encompasses the handle adjacent to said section. It is advantageous that the section where the operating element or the switching element is located is located at the machine housing of the machine tool in such a way that the operating element or the switching element can be operated with the thumb or index finger of a hand encompassing the handle.

In one of the operating element positions the switching element for example projects not at all or less far in front of the gripping area or the above-mentioned section of the gripping area, so that the operator can encompass the handle easily without interference by the operating element or switching element. Using the at least one allocation parameter, the actuation function typical for the main use of the machine tool can be allocated to said non-interfering operating element position as it were. In a design as a screwing machine, this is a clockwise rotation of the tool holder, for example.

A right-handed person can for example parameterise the operating element for clockwise rotation in such a way that it projects not at all or only a little into the gripping area in front of a side of the machine housing which is the right-hand side in the working direction. A left-handed person, on the other hand, parameterises the operating element for clockwise rotation in such a way that the operating element projects not at all or only a little into the gripping area in front of the left-hand side of the machine housing.

In the at least one operating element, in particular in the switching element, it can be provided that it projects in the first operating element position in front of a first side of the machine housing of the machine tool and in the second operating element position in front of a second side of the machine housing which differs from the first side of the machine housing, being in particular averted from the first side of the machine housing or located opposite the first side of the machine housing. The first and the second side of the machine housing are a left-hand and a right-hand side of the machine housing, for example, as viewed towards the front in the working direction. It is also possible, however, that the mutually averted sides of the machine housing are oriented at an angle to each other.

At the handle, adjacent to the at least one operating element, in particular the switching element, which could also be described as first operating element, a second operating element, in particular a switching element, is advantageously located for switching the drive motor on or off and/or for setting a speed of the drive motor. The second operating element or switching element can advantageously be operated with the index finger of a hand encompassing the handle. A distance between the first operating element and the second operating element is preferably maximally 2 cm, in particular maximally 1 cm and particularly preferably less than 9 mm An advantageous concept provides that the at least one operating element comprises or is represented by a tough-sensitive screen, i.e. a so-called touch display, for example. This being so, a tough-sensitive screen can serve as an operating element, for example. By operating various areas of the screen, various actuation functions can be selected. By means of the at least one allocation parameter, it is possible to allocate areas of the screen to different actuation functions. In this way a first area of the screen can be allocated to a first actuation function, for example, and a second area of the screen to a second actuation function using the at least one allocation parameter.

It is advantageous if the at least one function unit comprises or is represented by the drive motor and the at least one actuation function is provided and designed for actuating the drive motor by the control device. The actuation function is for example provided for setting a speed and/or a speed curve and/or a torque.

It is preferred if the at least one actuation function comprises a first actuation function for actuating the drive motor in a first direction of rotation, in particular a clockwise rotation, and a second actuation function for actuating the drive motor in a second direction opposed to the first direction of rotation, in particular an anticlockwise rotation. Using the at least one allocation parameter, the first operating element position can for example be allocated to the first actuation function and the second operating element position of the operating element can be allocated to the second actuation function.

The at least one function unit can also comprise an illumination means, for example, and the at least one actuation function can be provided and designed to actuate the illumination means. The illumination means for example comprises an arrangement with an LED or several LEDs. The illumination means can be a part of an illumination device. It can for example be provided that the illumination means is provided for illuminating a working area of the machine tool. The illumination means can also be provided and designed to output at least one status message and/or warning message.

The actuation function is for example designed to actuate the illumination means in at least one light colour. The actuation function can thus actuate the illumination means to shine in a first or alternatively in a second light colour. In this, LEDs of different colours can be actuated by the actuation function, for example.

It is furthermore possible that the at least one actuation function is designed to actuate the illumination means in an illumination intensity. The illumination intensity can be variable, so that a first illumination intensity can for example be set at a first operating element position of the operating element and a second illumination intensity which differs from the first illumination intensity can be set at a second operating element position.

The allocation of the operating element positions to the actuation function using the at least one allocation parameter can furthermore also be provided for the purpose that the actuation function actuates the illumination means with permanent illumination duration or with recurrent, in particular cyclical, illumination duration, e.g. flashing. The actuation function can therefore also be designed to actuate the illumination means with permanent or recurrent illumination duration.

The parameterising interface can be designed in various ways. A few possibilities which can be provided individually or in combination are presented below.

It is advantageous if the parameterising interface is designed to determine the at least one allocation parameter using a predetermined operation of an operating element by an operator. It is in particular advantageous if precisely that operating element for which the allocation parameter is to be determined and/or generated can be actuated by a predetermined actuation sequence or operating sequence in order to determine the allocation parameter. A repeated operation of an operating element into an operating element of the operating element can be provided for determining the allocation parameter, for example. Using the example of the direction of rotation switch or the parameterisation of an operating element as direction of rotation switch, such a configuration can for example provide that the operating element, starting from an intermediate position between the first and the second operating element position, has to be operated into the first or the second operating element position in order to actuate or set an allocation of the first or the second operating element position to an actuation function for clockwise rotation. The control device or the machine tool can allocate the respectively other of the first or the second operating element position to anticlockwise rotation.

It is advantageously provided that the parameterising interface comprises a user interface for the input of the at least one allocation parameter by a user. The user interface is advantageously located on board of the machine tool. The user interface may however also be a part of the parameterising device explained below. The user interface comprises a display, for example, in particular a touch-sensitive screen, an operating element, for example a pushbutton and/or a joystick or the like. It is thus for example possible to set an allocation of the operating element and of at least one operating element position to an actuation function at a touch-sensitive screen, for example by a suitable actuation of graphics indicating the operating element to be parameterised.

One embodiment advantageously provides that the parameterising interface comprises or is represented by voice recognition means for the detection of a spoken command of an operator and/or gesture recognition means for the detection of a gesture of an operator in order to determine the at least one allocation parameter.

The voice recognition means recognise spoken commands of the operator, for example "direction of rotation switch right for clockwise rotation" or "direction of rotation switch left for clockwise rotation", wherein "right" represents an operating element position of the operating element which is on the right-hand side in the working direction, for example, and "left" represents an operating element position of the operating element which is on the left-hand side in the working direction, and "clockwise rotation" and "anticlockwise rotation" denote actuation functions.

The gesture recognition means advantageously comprise at least one acceleration sensor and/or gyroscope. Other sensors are readily possible as well, for example an optical sensor for detecting a gesture. If the operator therefore moves the machine tool in a predetermined sequence of movements, for example, the at least one allocation parameter can be parameterised thereby. An optical sensor suitable for the detection of a gesture can also form a part of the gesture recognition means, however.

A parameterising concept with a quasi-external parameterisation device is preferred.

The parameterising interface thus preferably comprises a communication interface for receiving the at least one allocation parameter from a parameterising device which is separate and structurally disconnected from the machine tool.

The machine tool is preferably a part of a system comprising the machine tool and the parameterising device. The invention therefore also relates to a system comprising a machine tool according to the invention and a parameterising device provided for the parameterisation thereof.

The parameterising device preferably has a processor for executing a parameterising programme with which the at least one allocation parameter can be generated. The parameterising device furthermore advantageously has a communication device or communication interface for sending the at least one allocation parameter. The parameterising programme is a so-called app, for example.

Manifold designs are possible in the parameterising device.

One embodiment may provide that the parameterising device comprises or is represented by a mobile phone or Smartphone.

Alternatively or in addition, it is also possible that the parameterising device forms a part of a transport container having a machine receptacle for accommodating the machine tool. The transport container is used for transporting the machine tool, for example, in particular on the way from and to building sites. The transport container for example has a container body in which the machine receptacle is located. The transport container preferably has a cover. The parameterising device is preferably located at an outside of the transport container and easily accessible.

It is furthermore advantageous if the parameterising device can be connected to the parameterising interface via a network, for example the Internet, but also a local network such as a WLAN network. In this way the machine tool can be parameterised with the at least one allocation parameter, for example via a so-called Cloud.

It is advantageous if the communication interface comprises a log-in interface for logging the parameterising device in with the machine tool. The log-in interface is advantageously designed for checking an authenticity and/or identity and/or access identifier. The parameterising device or its parameterising programme preferably has matching means. The parameterising device and/or its parameterising programme for example have/has communication means for sending at least one authentication information and/or identification information and/or an access identifier. It is thus in any case possible that only a parameterising device entitled to parameterise the at least one allocation parameter performs the parameterisation.

The parameterising interface of the machine tool can for example comprise a wired communication interface or data interface for receiving the at least one allocation parameter. Connecting contacts for electrically connecting the parameterising device are advantageous, for example. The communication interface or data interface can be or comprise an LAN interface or Ethernet interface, for example.

Alternatively or in addition to the wired communication interface or data interface, a wireless communication interface or data interface is advantageous. The communication interface or data interface for example comprises a Bluetooth interface and/or a near field communication interface (NFC interface) and/or a mobile radio interface and/or a WLAN interface.

It is advantageous if the parameterising interface comprises a data interface to an electric energy storage device for receiving the at least one allocation parameter from the electric energy storage device. In this way the allocation of the operating element and its operating element positions to the at least one actuation function can be parameterised by means of the energy storage device. The energy storage device is preferably a rechargeable energy storage device, in particular a so-called battery pack. The energy storage device is used to supply power to the machine tool, for example its drive motor and/or its control device. The machine tool advantageously has an energy storage device connection for releasably attaching or mounting the energy storage device. The energy storage device can therefore be replaced if required, for example when its energy reserve is exhausted.

The machine tool advantageously forms a part of a system comprising the machine tool and the energy storage device. The invention therefore also comprises a system with the machine tool and the energy storage device.

It is advantageously provided that the energy storage device comprises or is represented by an operating interface for capturing the at least one allocation parameter. The operating interface of the energy storage device can for example comprise a touch-sensitive screen, an operating button or another control element for generating and/or configuring the at least one allocation parameter.

In the energy storage device it is furthermore advantageously provided that it has or is represented by an in particular wireless communication interface, in particular a Bluetooth interface and/or a near field communication interface (NFC interface) and/or a mobile radio interface and/or a WLAN interface, for capturing the at least one allocation parameter. The communication interface can also be wired, however. The energy storage device thus serves as a gateway for the parameterisation of the machine tool.

It is readily possible, however, that the parameterising interface of the machine tool is designed to receive the at least one allocation parameter via the energy storage device on the one hand or directly, i.e. without the energy storage device, on the other hand. Both measures can be provided in combination as well.

It is furthermore advantageous if the at least one actuation function has an actuation characteristic for actuating the at least one electric function unit which cannot be changed by an operator. The allocation of the operating element or the operating element positions of the operating element to the actuation function thus for example means only that the actuation function is triggered. The actual basic function of the actuation function, e.g. a clockwise rotation or an anticlockwise rotation of the drive motor, cannot be changed by means of the allocation parameter.

An alternative or additional embodiment can provide that the at least one actuation function has an actuation characteristic for actuating the at least one electric function unit, wherein the actuation characteristic can be parameterised in addition to the parameterisation using the at least one allocation parameter. The parameterising interface is preferably designed with this additional parameterisation.

The actuation characteristic can for example relate to an illumination duration of an illumination means, i.e. an illumination interval of the illumination means can be set via the parameterising interface, irrespective of whether the operating element is allocated to the actuation function or not, or whether an operating element position is allocated to the actuation function or not.

The parameterisable actuation characteristic can for example also relate to a maximally settable speed of the drive motor, a starting behaviour, for example a so-called starting ramp, of the drive motor, or the like. The operation of the operating element to which the actuation function is allocated does not have any effect on the starting behaviour or the maximum speed of the drive motor, however. The allocation parameter is therefore different from an operating parameter for the parameterisation of the at least one actuation characteristic of the actuation function.

It is furthermore possible that the at least one actuation function has an actuation characteristic for actuating the at least one electric function unit, which characteristic can be adapted by means of a learning function to an operating situation of the machine tool for an operation of the machine tool. A learning function can for example provide an adaptation of a speed profile to an actual operating situation. The actuation function for example has a first and a second speed profile depending on the learning function. Although the operating element is allocated to the actuation function, i.e. the actuation function drives the drive motor on operation of the operating element, the operation of the operating element does not influence whether the actuation function actuates the drive motor with the first speed profile or with the second speed profile.

The at least one allocation parameter can advantageously only be parameterised at a standstill of the drive motor. In this way operating errors, safety-critical situations or the like can be avoided.

It is furthermore advantageous if the actuation function which can be allocated or configured by means of the at least one allocation parameter is not a safety-relevant function. It can thus for example be provided that a safety-relevant function can always be executed and does not depend on whether an operating element with which the function can be switched on or deactivated is allocated to it.

A further advantageous measure provides that the operating element which can be parameterised using the at least one allocation parameter is not a safety-relevant operating element and/or provided for switching on the machine tool. A switch with which the drive motor can be switched on can therefore not be parameterised, for example.

It is furthermore advantageously provided that an operating element position of the at least one operating element or the operating element as a whole can be deactivated via the parameterising interface. This can for example be realised by providing that no allocation parameter for an actuation function is allocated to the respective operating element position or to all operating element positions of the operating element. If the operating element is in the respectively deactivated operating element position, the control device does not perform an actuation function if the operating element is moved into the at least one operating element position. If the operating element is deactivated as a whole, the control device does not perform an actuation function at any operation of the operating element.

BRIEF DESCRIPTION OF THE DRAWINGS

Exemplary embodiments of the invention are explained below with reference to the drawing, in which:

FIG. 8 shows a perspective oblique view of the hand-held power tool according to the preceding figures, partially as an exploded view.

FIG. 9 shows a cross-section through a gear mechanism and a striking mechanism of the hand-held power tool according to the preceding figures, FIG. 10 shows a section D1 of the striking mechanism according to FIG. 9, FIG. 11 shows a perspective oblique view of a gear mechanism switching element of the hand-held power tool of the preceding figures at an angle from above, FIG. 12 shows the gear mechanism switch according to FIG. 11 from its underside.

DETAILED DESCRIPTION

Figure 1:
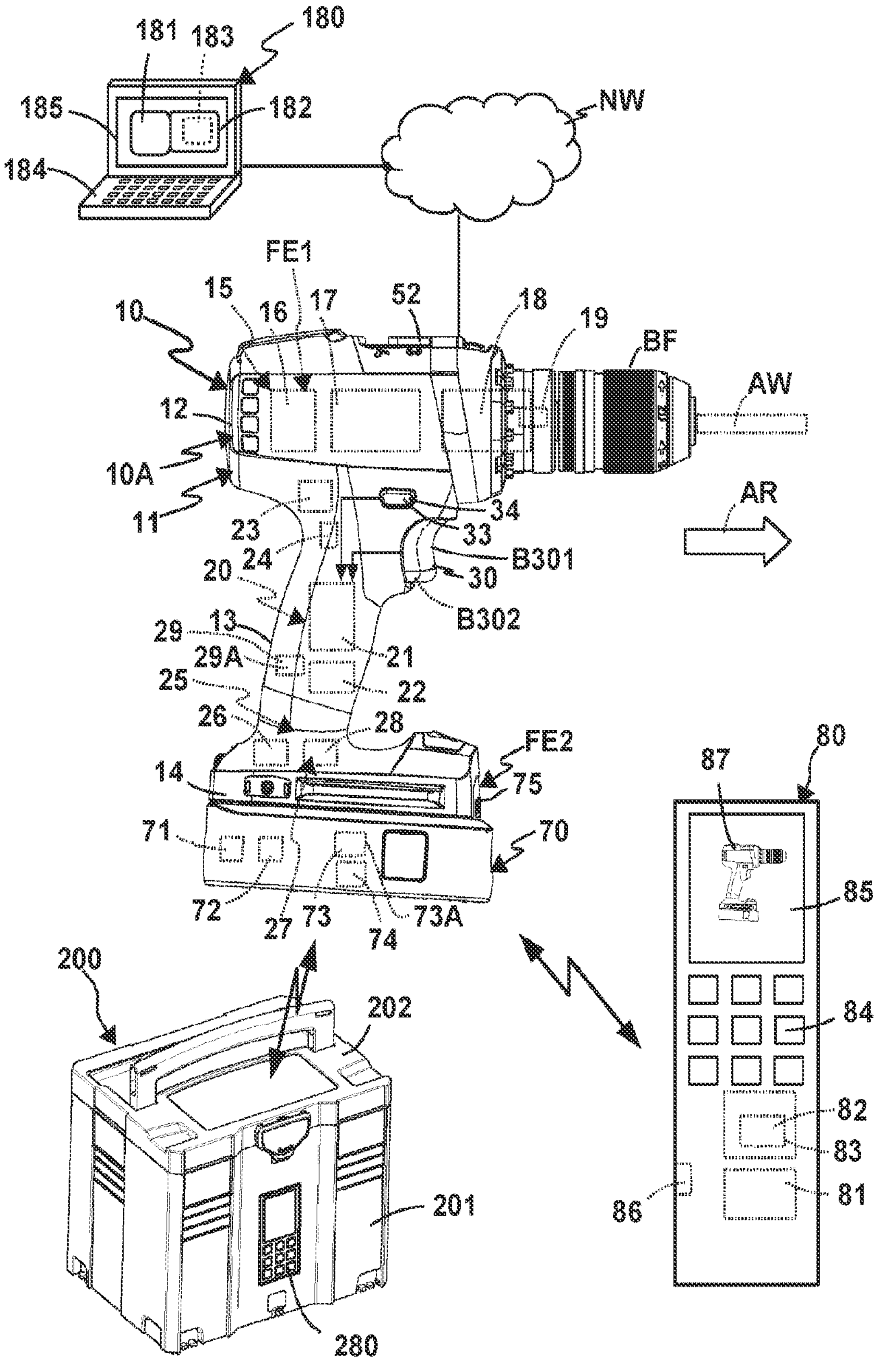
FIG. 1 shows a system comprising a hand-held power tool as well as configuration devices for configuring the hand-held power tool.
Figure 2:
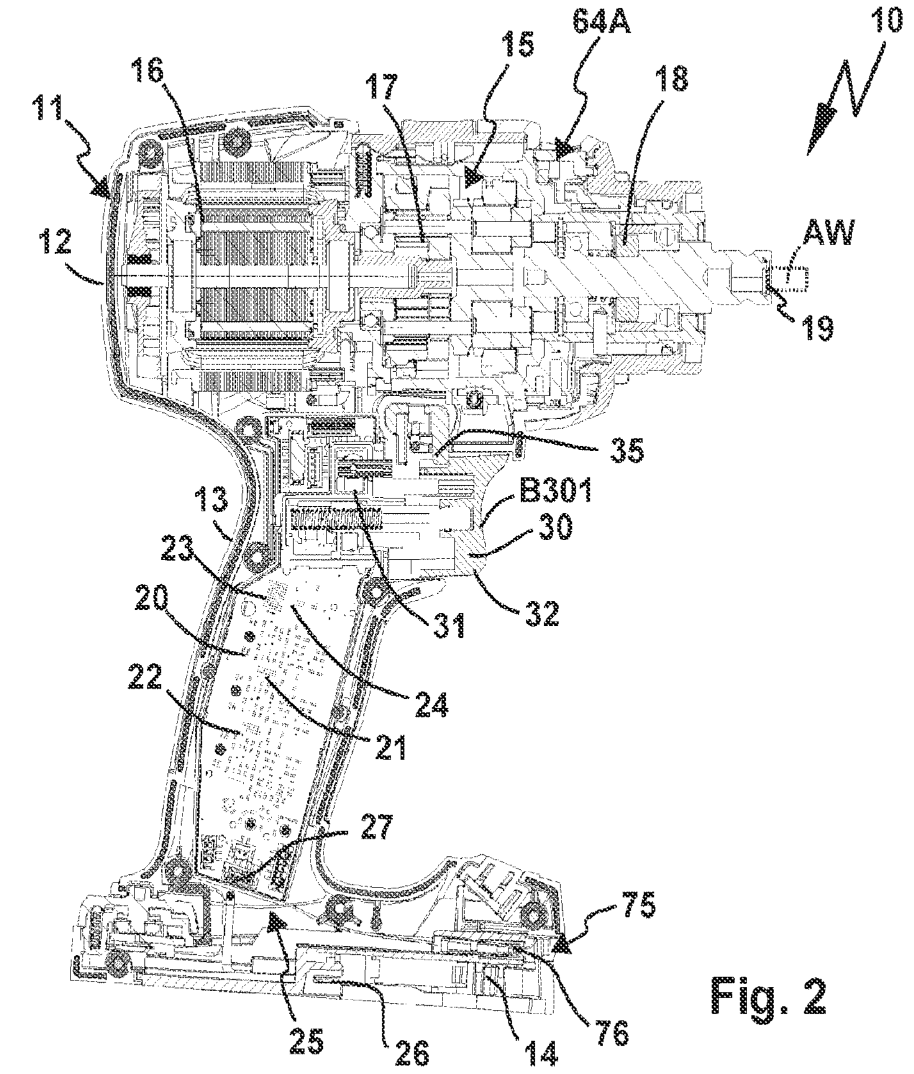
FIG. 2 shows a cross-section through the hand-held power tool according to FIG. 1.

A machine tool 10 in the form of a hand-held power tool has a machine housing 11. The machine housing 11 comprises a drive portion 12 and a handle portion 13. The handle portion 13 for example projects in the manner of a handle 13A, in particular of a pistol grip, from the drive portion 12. The machine housing 11 further comprises an energy storage device connection 14 for an electric energy storage device 70, e.g. a battery pack. The drive portion 12 and the energy storage device connection 14 are located on mutually opposite sides of the handle portion 13.

In the drive portion 12 there is a drive train 15 with an electric drive motor 16 driving a selectable gear mechanism 17. The selectable gear mechanism 17 drives, via a striking mechanism 18, a tool holder 19 provided for accommodating a work tool AW, e.g. a drill, screwdriver bit or the like. The work tool AW can however also be accommodated in a drill chuck, for example, which can be mounted at the tool holder 19.

The drive motor 16 can be actuated using an electric control device 20, which is shown partially diagrammatically in the drawing. The control device 20 for example comprises a processor 21, a memory 22 and an energisation device 23 for energising the drive motor 16. Although the drive motor 16 can be a universal motor, for example, it is preferably a brushless or electrically commutated motor. For its energisation, the energisation device 23 is suitable, which can comprise suitable power-electronics components, for example a bridge circuit etc.

The control device 20 furthermore communicates with the electric energy storage device 70 via an interface 25. The interface 25 for example comprises power supply contacts 26 for transferring electric power from the energy storage device 70 for operating the control device 20 and the drive motor 16. The interface 25 furthermore comprises a data interface 27 for data communication with the energy storage device 70.

The control device 20 can be actuated using operating elements 30, 33.

The operating element 30 for example comprises a switch 31, with which the drive motor 16 can be switched on and off and with which its speed can preferably be adjusted as well. The operating element body 32 of the operating element 30, for example an operating button, can be moved by an operator between an extended first operating element position B301 shown in the drawing and a second operating element position B302, in which it has been operated—pressed as it were—by an operator. In the operating element position B301 the drive motor 16 is routinely switched off and in the operating element position B302 switched on. Several operating element positions B301 can be provided, for example to set different speeds of the drive motor 16.

Figure 3:
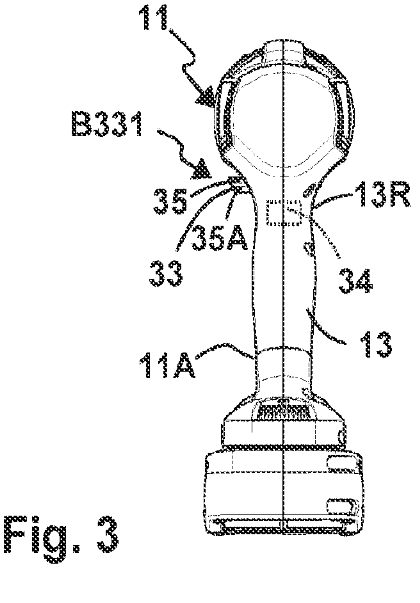
FIG. 3 shows a rear view of the hand-held power tool with an operating element in a first operating element position.
Figure 4:
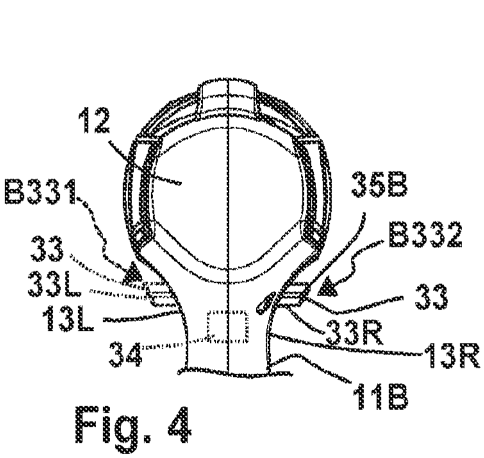
FIG. 4 shows an upper part of the view according to FIG. 3 with the operating element in a second operating element position.
Figure 5:
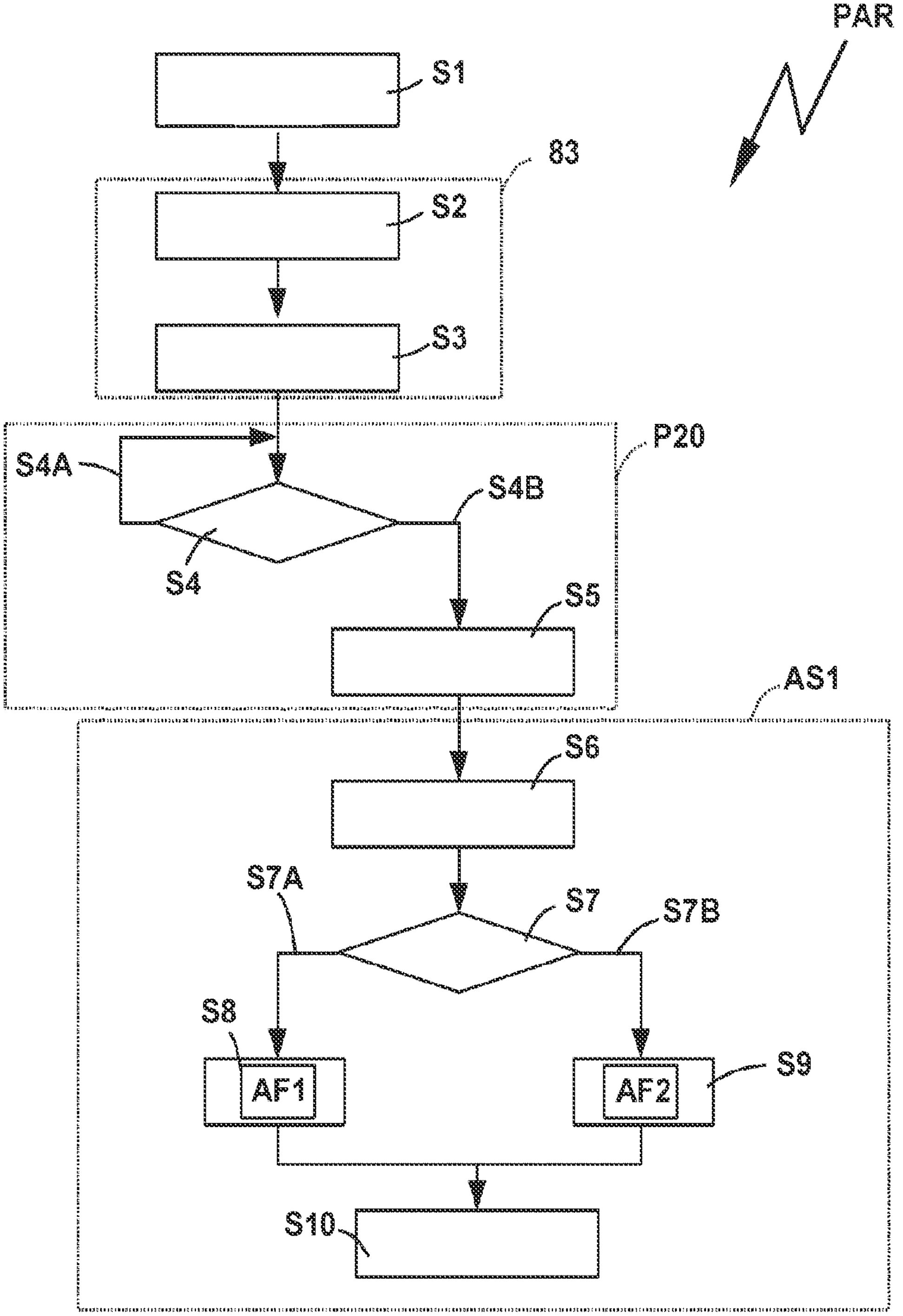
FIG. 5 shows a flow chart of a sequence of a configuration of the machine tools according to the preceding figures.

The operating element 33 for example comprises a switch or a switching element 34, with which a direction of rotation of the drive motor 16 can be set, for example a clockwise rotation or anticlockwise rotation of the drive motor 16. The operating element 33 comprises an operating element body 35, for example a slide, which can be moved between a first operating element position B331 and a second operating element position B332. In the operating element positions B331 and B332 longitudinal end regions 35A, 35B of the operating element body 35 project in front of mutually opposite sides 11A, 11B of the machine housing 11. In the operating element position B331, for example, the operating element body 35 projects towards the left in front of the machine housing 11 in a view of the machine housing 11 from the rear (FIG. 3), while projecting towards the right in front of the machine housing 11 in the operating element position B332 (FIG. 4).

In the operating element positions B331 and B332 the operating element 33 projects in front of gripping regions 13L and 13R, where an index finger of the operator rests or can rest when encompassing the handle 13A, for example. An operating section 33L of the operating element 33 represented by the longitudinal end region 35B for example projects farther in front of the gripping region 13L in the operating element position B331 than an operating section 33L of the operating element 33 represented by the longitudinal end region 35A projects in front of the gripping region 13R. In the operating element position B332, on the other hand, the operating section 33L projects not at all or less far in front of the gripping region 13L, while the operating section 33R of the operating element 33 projects far in front of the gripping region 13R.

An output 16A of the drive motor 40 drives the gear mechanism 17 at a gear drive 40.

The gear mechanism 17 has a first shift stage 41 and a second shift stage 42, which are individually selectable. The gear mechanism 17 therefore is a four-speed mechanism. For setting the shift stages 41, 42 of the gear mechanism 17, gear selection elements 43, 44 are provided, which can be operated using a gear mechanism operating element 50.

The gear selection elements 43, 44 are mounted for longitudinal displacement, for example for longitudinal displacement parallel to an axis of rotation D of the tool holder 19.

The gear selection element 43 acts on the shift stage 41, for example on a planetary gear set 45 and/or a ring gear 46 of the shift stage 41.

The gear selection element 44 acts on the shift stage 42, which comprises a planetary gear set 47 located at a planetary carrier 48.

The gear selection element 43 for example blocks a rotation of the ring gear 47 or enables it to rotate.

The gear selection element 44 for example forms a ring gear for the planetary gear set 47. The gear selection element 44 can for example couple the planetary gear set 47 to a planetary carrier 45T, at which the planetary gear set 45 is rotatably mounted, non-rotatably to the planetary gear set 47, thus quasi-deactivating the shift stage 42.

The gear mechanism operating element 50 is motion-coupled to the gear selection elements 43, 44 by means of a driver 49, which can form a part of an adjusting gear, so that the gear selection elements 43, 44 can be adjusted in coordinated movement sequences relative to one another and relative to the respectively selected shift stages 41 and 42. The driver 49 is for example accommodated in a receptacle 53 of the gear mechanism operating element 50, which is located on a side of the gear mechanism operating element 50 facing the interior of the machine housing 11.

The gear mechanism operating element 50 forms an operating element 36.

In FIGS. 13A, 13B, 13C, 13D various operating element positions P1, P2, P3, P4 of the operating element 36 or the gear mechanism operating element 50 can be seen, in which the gear mechanism 17 is shifted to a first gear G1, a second gear G2, a third gear G3 and a fourth gear G4.

The gear mechanism operating element 50 is located on a top side of the machine housing 11. An operating body 51 of the gear mechanism operating element 50 is located below a window 11A of the machine housing 11, for example. An operating projection 52 provided at the operating body 51 projects into the window 11A. In the operating element positions P1, P2, P3, P4 the operating projection 52 is for example positioned in corner regions of the window 11A which are allocated to said operating element positions, wherein the gear G1-G4 respectively selected thereby is identifiable for the operator by index markings, e.g. numerical values 1, 2, 3 and 4.

In order for the control device 20 to be able to provide a suitable actuation of the drive motor 16 in the respective gears G1-G4, a detection of the respective position of the gear mechanism operating element 50 is advantageous. It would now be conceivable to locate a position sensor in the region of the window 11A in order to detect the respective operating element position of the gear mechanism operating element 50. It is advantageous, however, if no electric components are required on the top side of the machine housing 11, but the control device 20 can detect the respective operating element position P1-P4 directly.

For this purpose the gear mechanism operating element 50 has an arm 54, which extends past the gear mechanism 17 and/or the drive motor 16 and has a switching transducer 37 actuating a gear mechanism sensor 24 at its free end. The gear mechanism sensor 24 is a contactless sensor, for example, and can detect the respective position of the switching transducer 37 The switching transducer 37 can be an optical transducer and the gear mechanism sensor 24 can be an optical sensor, for example. It is advantageous if the switching transducer 37 is a magnetic switching transducer, for example a permanent magnet or a magnetically conductive body, and if the gear mechanism sensor 24 is a magnetic sensor, for example a Hall sensor or the like. By screening and/or magnetic conducting bodies, a respective position of the switching transducer 37 can be precisely detected. In FIGS. 14A-14D as well as 15A-15D, the respective relative positions of the switching transducer 37 and the gear mechanism sensor 24 are shown. It can be seen that the various operating element positions P1-P4 and thus the selected gears G1-G4 can be detected by the control device 20 from different longitudinal distances and/or transverse distances between the switching transducer 37 and the gear mechanism sensor 24.

Several gear mechanism sensors 24 can readily be provided in order to enhance the detection accuracy. A gear mechanism sensor 24 can for example be provided for each of the positions P1-P4, wherein an optimal detection accuracy can be realised by suitable screening, for example magnetic screening, between the gear mechanism sensors 24.

Threshold value formation, plausibility checks or the like also enable the control device 20 to detect the individual positions P1-P4 reliably even if only a single gear mechanism sensor 24 or fewer than four gear mechanism sensors 24 is/are provided, for example.

An output 55 of the gear mechanism 17 drives an output shaft 56, at the free end regions of which the tool holder 19 is located. The output shaft 56 is mounted rotatably about the axis of rotation D with respect to the machine housing 11 by means of bearings 57, 58.

The striking mechanism 18 comprises a first striking body 60, in particular an anvil body, and a second striking body 61, in particular a hammer disc or hammer body. The striking bodies 61, 60 are loaded away from each other by a spring 62, which is in particular advantageous if the machine tool 10 is used in a vertically upward manner, for example in an overhead screwing or drilling operation. Contours 60K, 61K are provided at mutually facing ends of the striking bodies 60, 61, so that, at a relative rotary movement of the striking bodies 60, 61 about the axis of rotation D, the striking body 61 is subjected to an axial force away from the striking body 60 with respect to the axis of rotation D.

The second striking body 61 is held non-rotatably at the output shaft 56 with respect to the axis of rotation D.

The first striking body 60 is mounted so as to be stationary with respect to the machine housing 11. For this purpose an anti-rotation device 63, in particular a bolt, is provided, which positively engages with the striking body 60 radially on the outside with respect to the axis of rotation D. The bolt or the anti-rotation device 63 passes through a head housing 59, for example a sleeve or a sleeve body, in which the two bearings 57, 58 are accommodated among other things.

The head housing 59 preferably consists of metal. The head housing 59 is permanently joined to the machine housing 11, for example bolted, bonded or welded thereto. In principle it would be possible for the head housing 59 and the machine housing 11 to be designed in one piece, wherein assembly is made easier if the head housing 59 is a part which is separate from the machine housing 11 but can be releasably joined thereto. The anti-rotation device 63 is held in engagement with the striking body 60 by a support 63A. The support 63A for example comprises an angle plate or the like. The support 63A is mounted so as to be stationary with respect to the machine housing 11, for example bolted thereto or joined thereto by other means. A screw 63B is shown by way of example for fastening the support 63A.

For the support of axial forces parallel to the axis of rotation D, a support 59A is provided, at which the bearing 57 is supported. The support 59A is fixed in the sleeve or the head housing 59. The output shaft 56 passes through the support 59A.

For moving the striking mechanism 18 between a striking operation (FIG. 9) and an operation without striking (FIG. 10), an adjusting device 64A is provided. The adjusting device 64A comprises an adjusting body 64, which can be adjusted by an operating element 65 between a striking operation position (FIG. 9) and a normal operation position, i.e. operation without striking, according to FIG. 9. The adjusting body 64 is for example designed as or forms a kind of switching sleeve. The adjusting body 64 can be operated by an operating element 65, which is mounted so as to be pivotable about the axis of rotation D with respect to the machine housing 11. The adjusting body 64 and the operating element 65 engage with each other with adjusting contours 65A, so that a rotary adjustment of the operating element 65 about the axis of rotation D causes an axial adjustment of the adjusting body 64 parallel to the axis of rotation D.

The adjusting body 64 is motion-coupled to a support body 64C using a transmission element 64B in such a way that an adjustment of the adjusting body 64 parallel to the axis of rotation D causes an adjustment of the support body 64C parallel to the axis of rotation D. The adjusting body 64 and the support body 64C are for example non-displaceably joined to each other with respect to the axis of rotation D by means of the transmission element 64B.

The support body 64C can therefore be movable by a rotary actuation of the operating element 65 parallel to the axis of rotation D into a first position for striking operation (FIG. 9), in which it is farther away from the first striking body 60, and into a position moved towards the striking body 60, which corresponds to a normal operation without striking. In the striking operating position the output shaft 56 has an axial play with respect to the axis of rotation D, so that the contours 60K, 61K cause an axial operation of the output shaft 56, i.e. a striking operation, at a rotary movement of the output shaft 56. In the normal operation position (FIG. 10) the support body 64C supports the bearing 58 in such a way that the striking bodies 60, 61 ate held out of engagement and can therefore not cause an axial operation of the output shaft 56 parallel to the axis of rotation D.

The construction described below should be understood in terms of an electric insulation as well as in terms of optimal fixing. In particular it facilitates a comfortable mounting of the handle, for example a grab bar, which projects from the machine housing 11 and thus makes the holding of the machine tool 10 easier.

In an end region facing the tool holder 19, a support body 66 is located at the outer circumference of the head housing 59. The support body 66 consists of plastic, for example, the metallic head housing 59 being in particular over-moulded with the material of the support body 66. At the radial outer circumference if the support body 66, an annular body 66A, for example an O-ring or the like, can be provided. The support body 66 advantageously contributes to an electric insulation.

The operating element 65 is movably held at an annular body 67 and passes through a through-opening (not shown in detail in the drawing) of the annular body 67. The annular body 67 consists of metal, for example, in particular of aluminium. The annular body 67 is pushed onto a receptacle 11A of the machine housing 11. The machine housing 11 preferably consists of plastic, thus of an electrically insulating material. Since the annular body 67 lies on the insulating material, it is electrically insulated.

The annular body 67 is in turn fixed to the machine housing 11 by a flange body 68. The annular body 67 is sandwiched between the machine housing 11 and the flange body 68. The flange body 68 is for example bolted to the machine housing 11 by means of screws. The flange body 68 preferably consists of plastic, thus being electrically insulating. A handle can be mounted at the flange body 68, for example. The flange body 68 is supported by the support body 66.

At a front portion of the machine housing 11, i.e. in the front in a working direction A, an illumination device 75 is preferably located, with which a working environment near the tool holder 19 can be illuminated. The illumination device 75 can also be designed to display status messages.

A further operating element 38 is provided by a touch-sensitive display located at the machine housing 11, for example, in particular on its top side. Via the operating element 38 an operator can issue control commands, for example for switching the illumination device 75 on or off. The operating element 38 comprises a touch-sensitive screen or a touch-sensitive display 38A, for example.

The drive motor 16 or the drive train 15 forms a first function unit FE1, which can be actuated by the control device 20 by means of actuation functions AF1 and AF2.

The illumination device 75 forms a second function unit FE2, which can be actuated by the control device 20 by means of actuation functions AF3 and AF4.

The respective actuation functions AF1 to AF4 can be allocated to the operating elements 33 and 38. For this purpose parameterising devices 80, 180 or 280 are suitable, for example.

The parameterising device 80 is a mobile parameterising device, for example a Smartphone, a mobile telephone or the like. The parameterising device 80 may also be a Notebook, for example, or another similar mobile computer. The parameterising device 80 comprises a processor 81 and a memory 82, in which a parameterising programme 83 is stored for execution by the processor 81. The parameterising device 80 furthermore comprises an input means 84, for example a keyboard and/or a touch-sensitive screen, and an output means 85, for example a screen, LEDs or the like. The input means 84, in particular a touch-sensitive screen of the input means 84, advantageously forms a user interface for inputting the at least one allocation parameter.

The parameterising device 80 furthermore has a communication interface 86 for communication with a communication interface 29 of the machine tool 10 and/or for communication with a communication interface 73 of the energy storage device 70. The parameterising device 80 can therefore directly communicate with the control device 20 via the communication interface 29 or via the energy storage device 70 using the communication interface 73.

The communication interfaces 29, 73 are preferably wireless communication interfaces, for example Bluetooth interfaces, WLAN interfaces, near field communication interfaces or the like.

The energy storage device 70 has a processor 71 and a memory 72. The processor 71 for example executes a communication programme K70 for communication at the communication interface 73.

The communication programme can furthermore facilitate a communication between the communication interface 73 and a data interface 74 of the energy storage device 70, which data interface 74 can be coupled to the data interface 27, so that the energy storage device 70 forms a gateway for the control device 20, as it were.

The data interfaces 27, 74 can be wired or contacted data interfaces. For this purpose they have transmission contacts, for example, which come into contact with one another when the energy storage device 70 is mounted at the energy storage device connection 14. It is also possible, however, that the data interfaces 27, 74 are wireless interfaces, for example Bluetooth interfaces, near field communication interfaces or the like.

The parameterising device 280 forms a part of a transport container 200. The transport container 200 has a body 201, in the interior of which a machine receptacle for accommodating the machine tool 10 is provided, wherein the interior can be closed by a cover 202 of the transport container 200. The parameterising device 82 is in any case located at the transport container 200, for example on its outside. The parameterising device 280 can thus communicate with the machine tool 10, preferably when the latter is located in the interior of the transport container 200. A communication between the parameterising device 280 and the machine tool 10 is easily conceivable as well, however, if the latter is not accommodated in the transport container 200.

The parameterising device 180 is a Notebook, a server or the like, for example, wherein the parameterising device 81 can communicate with the machine tool 10 via a network NW, for example a Cloud. The parameterising device 180 for example has a processor 181, a memory 182 and a parameterising programme 183 stored in the memory 182.

Like the parameterising device 80, the parameterising device 81 has input means 184 and output means 185.

The parameterising devices 80, 180, 280 can for example perform the parameterising method PAR described below in relation to the machine tool 10, in order to allocate the output functions AF1-AF4 to the operating elements 33, 38. The parameterising method PAR provides procedural steps S1 to S9, which are described below.

In a step S1 the control device 20 and/or the machine tool 10 are/is activated, for example switched on. By pressing the operating element 30, for example, an operating action at the operating element 38 or the like, the control device 20 or the machine tool 10 can be activated.

In a step S2 the parameterising programme 83 is started, for example by at least one operation of a symbol 87 at the output means 85 of the parameterising device 80, and an operating mode suitable for left-handed persons is selected. The symbol 87 for example shows an image of the machine tool 10 and/or its operating elements, for example of the operating element 33.

In a step S3 the parameterising device 80, in particular its parameterising programme 83, sends to the control device 20 allocation parameters ZP1 and ZP2, with which for example the output function AF2, which corresponds to an anticlockwise rotation of the drive motor 16, is allocated to the operating element position B331, and the output function AF1, which corresponds to a clockwise rotation of the drive motor 16, is allocated to the operating element position B332. The parameterising device 80 for example sends the allocation parameters ZP1 and ZP2 directly to the communication interface 29 or to the communication interface 73 of the energy storage device 70, which transfers the allocation parameters ZP1 and ZP2 to the control device 20 via the data interface 74, 27.

A parameterising programme P20 executed by the processor 21 now controls the receipt of the allocation parameters ZP1 and ZP2. In a step S4 the parameterising programme P20 stops the drive motor 16.

The step S4 is repeated until the drive motor 16 is at a standstill. This is a safety measure. The parameterising programme P20 thus branches into the branch S4A and repeats the step S4 until the drive motor 16 is at a standstill. The parameterising programme P20 then branches into a step S5 via a branch S4B.

In the step S5 the parameterising programme P20 takes the allocation parameters ZP1 and ZP2 into the memory 22, in particular into a region of the memory 22 which is a non-volatile memory.

From the step S6 a control programme AS1 is now active, the programme code of which can be executed by the processor 21 of the control device 20 in order to execute the steps S6-810.

In step S6 the control programme AS1 for example receives a control command of the operating element 30, i.e. a command to operate the drive motor 16 if the operating element 30 is moved from the operating element position B301 into one of the operating element positions B302.

In a step S7 the control programme AS1 checks a position of the switch 34 or the switching element 34 in order to determine thereby whether the operating element 33 occupies the operating element position B331 or B332. Depending on the operating element position B331 or B332, the control programme AS1 calls up the actuating function AF1 or AF2 in order to drive the drive motor 16 accordingly for clockwise or anticlockwise rotation. The control programme AS1 thus branches in a step S7A either to a step S8, in which the actuating function AF1 is activated, or to a step S9, in which the actuating function AF2 is activated.

If the operating element 30 returns into the operating element position B331 and the drive motor 16 is to be switched off, the control programme AS1 terminates the operation of the drive motor 16 and stops it.

In a similar way, various areas of the operating element 38, i.e. of the display, can be allocated by the parameterising devices 80, 180 or 280 to the actuating functions AF3 and AF4 using allocation parameters ZP3 and ZP4, so that the control device 20 calls up either the actuating function AF3 or the actuating function AF4 on operation of a respective area of the operating element 38. On operation of a respective zone or a respective area of the operating element 38, the control device 20 actuates the illumination device 75 for switching its illumination means 76, e.g. LEDs 76, on or off in accordance with the actuating function AF3. On operation of another zone or another area of the operating element 38, the control device 20 actuates the illumination device 75 in accordance with the actuating function AF4, for example for changing an illumination intensity of the illumination device 75.

The data interface 27 and the communication interface 29 form parts of a parameterising interface 28 of the machine tool 10.

If none of the parameterising devices 80, 180 or 280 is available, for example on a building site or the like, a local parameterisation of operating elements can also be realised in the machine tool 10. The operating element 38 can for example form a part of the parameterising interface 28, e.g. a user interface UI. By a suitable operating action, for example long pressure on a zone of the operating element or display 38, an allocation parameter ZP3 or ZP4 can be generated.

Figure 6:
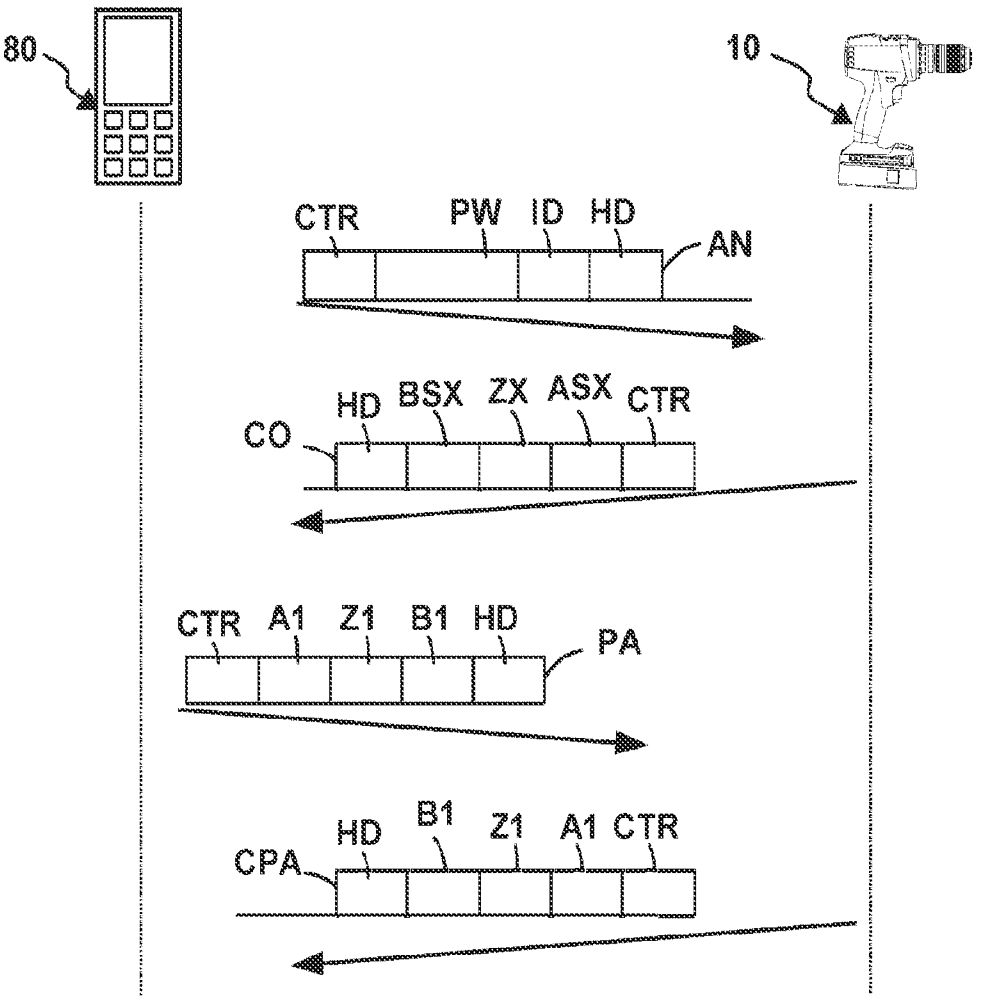
FIG. 6 shows a communication between the hand-held power tool and one of the configuration devices according to FIG. 1 at the configuration according to FIG. 5.
Figure 7:
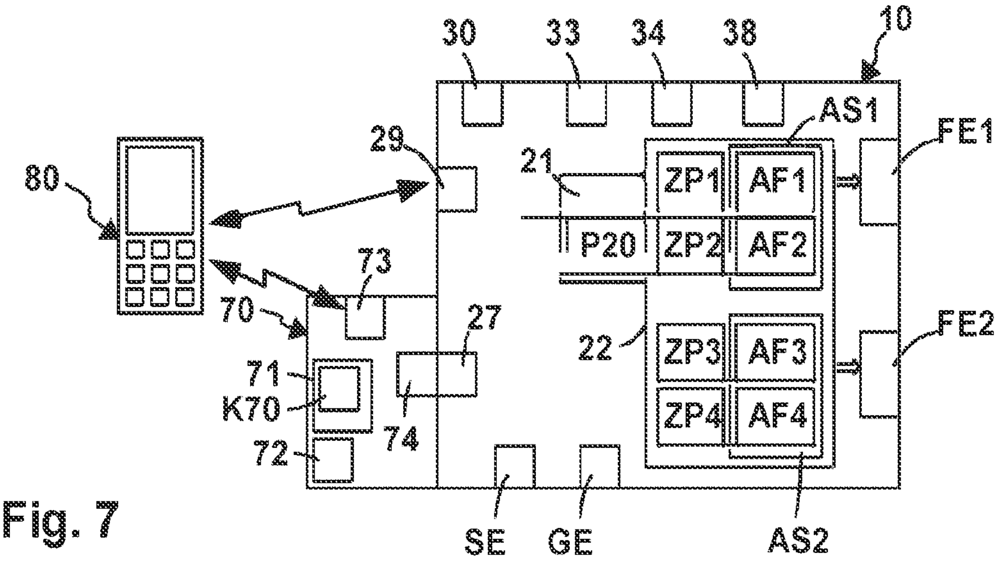
FIG. 7 shows a diagrammatic view of a control device of the hand-held power tool and the configuration device according to FIG. 6.
Figure 13A:
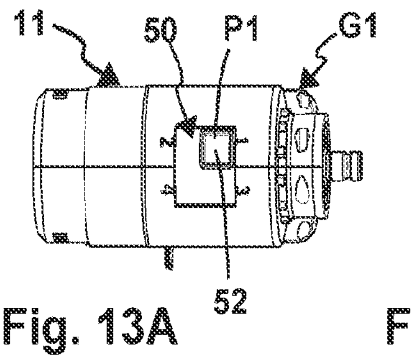
FIGS. 13A-13D show top views of the hand-held power tool according to the preceding figures, wherein the gear mechanism switching element according to FIGS. 11, 12 occupies four different switching positions allocated to the gear mechanism.
Figure 14A:
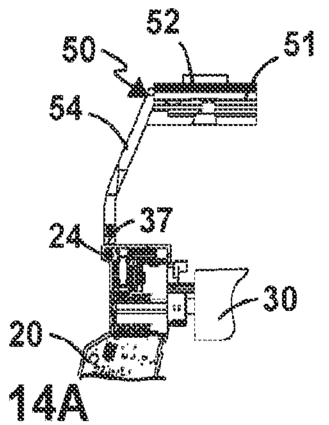
FIGS. 14A-14D show a side view of the gear mechanism switching element and an upper part of a control device of the hand-held power tool in the switching positions shown in FIGS. 13A-13D, FIGS. 15A-15D show a front view of the gear mechanism switching element and the upper part of a control device in the switching positions shown in FIGS. 13A-13D.
Figure 15A:
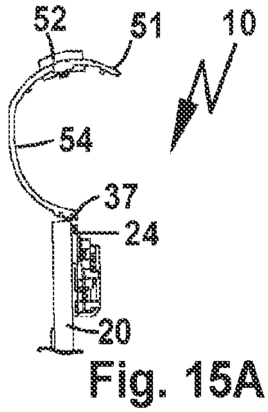
Figure 13B:
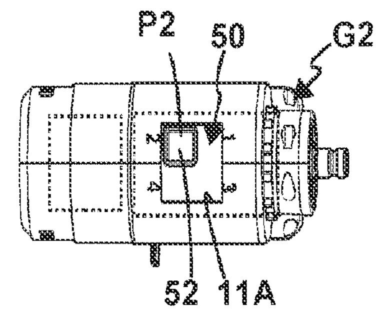
Figure 14B:
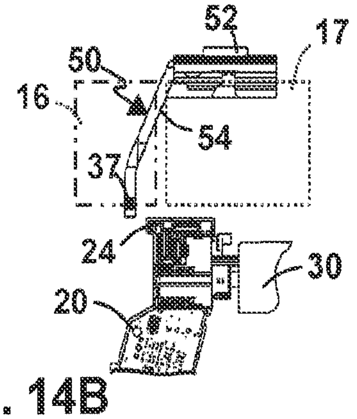
Figure 15B:
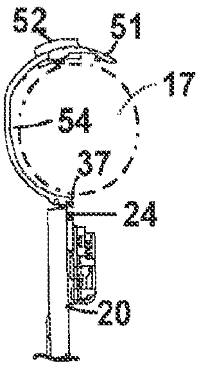
Figure 13C:
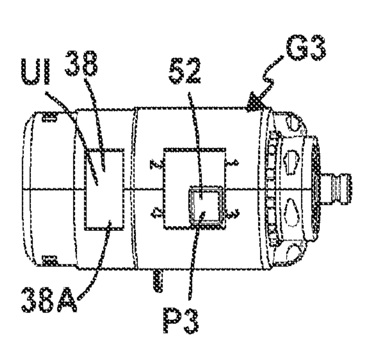
Figure 14C:
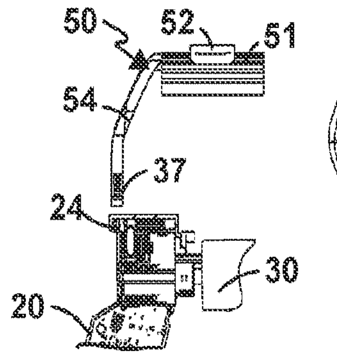
Figure 15C:
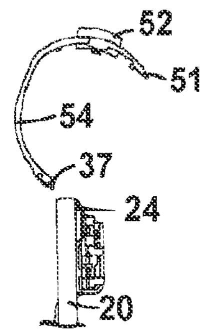
Figure 13D:
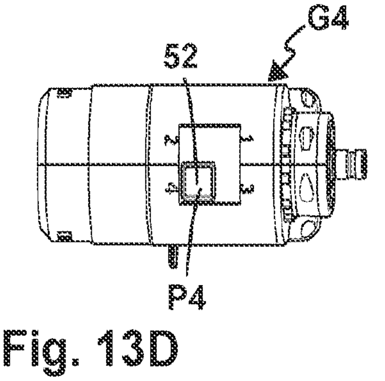
Figure 14D:
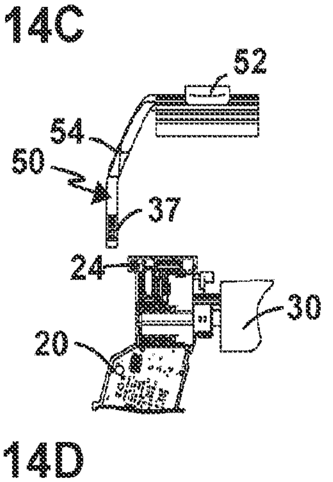
Figure 15D:
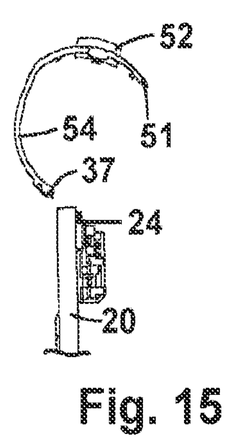

An exemplary data communication between the parameterising device 80 and the machine tool 10 is shown in FIG. 6.

The parameterising device 80 for example sends a log-in message AN to the machine tool 10 in order to log in there. The log-in message AN for example comprises a head HD with an address of the machine tool 10, an identifier ID, for example a definite identification of the parameterising device 80, in particular its address and a password PW. The log-in message AN is secured by a security code CTR, for example a CRC code.

The communication interface 29 and/or 73 for example comprise(s) or form(s) a log-in interface 29A, 73A for receiving the log-in message AN. The log-in interface 29A, 73A checks the identifier ID, for example, which forms or comprises an identifier for an authenticity and/or identity of the parameterising device 80, for example, as well as the password PW, which forms or comprises an access identifier, for example, If the machine tool 10 accepts the log-in message AN, i.e. if the parameterising device 80 is registered at the machine tool 10 as parameterising device entitled to parameterisation, for example, and the password PW is correct, the machine tool 10 sends confirmation message CO.

The confirmation message CO for example comprises a head HD with the address of the parameterising device 80. The confirmation message CO advantageously contains an information BSX about parameterisable operating elements, for example with the information that the operating elements 33, 38 are parameterisable. It is furthermore advantageous if the confirmation message CO contains an information ZX indicating which allocation parameters are possible in the operating elements 33, 38 or in any case in the operating elements specified in the information BSX. The confirmation message CO furthermore advantageously comprises an information ASX, which contains actuation functions which can be allocated to the operating elements specified in the information BSX, for example the actuation functions AF1 and AF2 with respect to the operating element 33.

The confirmation message CO and the messages PA and CPA explained below advantageously also contain a security code CTR.

It is also possible that the following communication runs without any preceding log-in, for example as explained in the context of the method PAR. Consequently it is possible to send only the confirmation message CO explained below within the parameterisation of the machine tool 10, optionally in addition the confirmation message CPA explained below.

On receiving the confirmation message CO, the parameterising device 80 sends a parameterisation message PA, which again contains a head HD, i.e. the address of the machine tool 10. The parameterisation message PA furthermore contains an information B1 about the operating element to be parameterised, for example the operating element 33, an information Z1 about the allocation parameters ZP1 and ZP2 to be allocated to the operating element 33 and an information A1 specifying which actuation function AF1 or AF2 is to be allocated to the respective allocation parameter ZP1 or ZP2.

In the preceding exemplary embodiment, in the context of the method PAR, it would be sufficient for the parameterising device 80 to send a simple parameterisation message PA, which only specifies whether the operating element 33 is to be parameterised for a left-handed operation or a right-handed operation.

It is advantageous if the machine tool 10, after the parameterisation of the operating element 33, i.e. for example after step S5, sends a confirmation message CPA, in which the above-described informations B1, Z1 and A1 are repeated, so that the parameterising device 80 contains an information whether or not the parameterisation was successful.

A parameterisation of the allocation parameters ZP1-ZP4 by means of voice recognition means SE is easily possible as well. The voice recognition means SE can be provided on board of the machine tool 10, for example. They may also form a part of one of the parameterising devices 80, 180, 280, however.

The machine tool 10 advantageously has gesture recognition means GE, for example one or more acceleration sensors. If the operator of the machine tool 10 for example tilts or accelerates the machine tool 10 in a predetermined operating sequence, for example operates it quickly to the right while the operating element 33 is in one of the operating element positions B331, B332, a clockwise rotation of the drive motor 16 can for example be allocated to the respectively set operating element position B331 or B332.

It is also possible that the actuation functions AF3 and AF4 are allocated to the operating element 33 and its operating element positions B331 and B332 by means of the allocation parameters ZP1 and ZP2, so that the illumination device 75 can switched on and off by moving the operating element 33 into the operating element positions B331 and B332, for example.

Likewise it is possible that the operating element 38 is parameterised or configured, for example to set the clockwise rotation and the anticlockwise rotation of the drive motor 16, by allocating the actuation functions AF1 and AF2 to the operating element 38, in particular to operating regions thereof.

The invention claimed is:

1. A machine tool comprising:

a pistol-shaped housing having a pistol grip handle for gripping by an operator of the machine tool;

a tool holder for holding a work tool;

a drive motor for driving the tool holder;

at least one electric function unit;

a control device for actuating the at least one electric function unit using at least one actuation function, the at least one electric function unit being designed to perform an output function depending on the actuation by the at least one actuation function;

at least one operating element disposed on the grip handle, the operating element being movable by an operator of the machine tool between a first operating element position and a second operating element position to actuate the control device; and a parameterizing interface for receiving instructions from a device external to the machine tool to assign the at least one allocation function to the first operating element position or to the second operating element position, such that, when the at least one operating element is moved into the first or the second operating element position, the control device actuates the at least one function unit using the at least one actuation function, wherein the at least one operating element projects outwardly from a first side of the pistol-shaped housing of the machine tool in the first operating element position and projects outwardly from a second side of the pistol-shaped housing opposite to the first side in the second operating element position, and wherein the at least one operating element is operable with fingers of a hand gripping the pistol grip handle, and wherein the at least one actuation function comprises a first actuation function for actuating the drive motor in a first direction of rotation, and a second actuation function for actuating the drive motor in a second direction of rotation opposed to the first direction of rotation.

2. The machine tool according to claim 1, wherein the at least one operating element comprises a first operating element and a second operating element and, by means of the parameterizing interface, at least one actuation function of the control device can be allocated to the first operating element and/or to the second operating element.

3. The machine tool according to claim 1, wherein the at least one operating element comprises or is represented by a switching element which can be moved mechanically between the first and the second operating element position for setting a direction of rotation of the drive motor.

4. The machine tool according to claim 3, wherein the at least one operating element projects outwardly from the housing in one of the operating element positions for activation by a right hand of the operator and projects outwardly from the housing in the other operating element positions for activation with a left hand of the operator.

5. The machine tool according to claim 4, wherein the at least one operating element projects farther in front of the first side of the machine housing in the first operating element position than in front of the second side of the machine housing, and/or projects farther in front of the second side of the machine housing in the second operating element position than in front of the first side of the machine housing.

6. The machine tool according to claim 1, wherein the at least one operating element and an operating element for switching the drive motor on and/or off and/or for setting a speed thereof are located at the handle.

7. The machine tool according to claim 1, wherein the machine tool further comprises a touch-sensitive screen.

8. The machine tool according to claim 1, wherein the at least one function unit comprises or is represented by the drive motor, and wherein the at least one actuation function is provided by and designed as the control device.

9. The machine tool according to claim 1, wherein the at least one electric function unit comprises an illumination device and/or an illumination means and the at least one actuation function is provided and designed for an actuation of the illumination means in at least one light color and/or with an illumination intensity and/or with a permanent or recurrent illumination duration.

10. The machine tool according to claim 1, wherein the parameterizing interface is designed to determine the at least one allocation parameter using a predetermined operation of an operating element by an operator.

11. The machine tool according to claim 1, wherein the parameterizing interface comprises a user interface for inputting the at least one allocation parameter by an operator.

12. The machine tool according to claim 1, wherein the parameterizing interface, for detecting the at least one allocation parameter, comprises or is represented by voice recognition means for detecting a voice command of an operator and/or gesture recognition means for detecting a gesture of the operator.

13. The machine tool according to claim 1, wherein the parameterizing interface has a communication interface for receiving the at least one allocation parameter from a parameterizing device, which is separate and structurally detached from the machine tool.

14. The machine tool according to claim 13, wherein the communication interface comprises a log-in interface for logging in the parameterizing device at the machine tool.

15. The machine tool according to claim 13, wherein the machine tool forms a part of a system comprising the machine tool and the parameterizing device.

16. The machine tool according to claim 13, wherein the parameterizing device comprises or is represented by a mobile telephone or Smartphone, and/or wherein the parameterizing device forms a part of a transport container having a machine receptacle for the accommodation of the machine tool, and/or when the parameterizing device can be connected to the parameterizing interface via a network.

17. The machine tool according to claim 13, wherein the parameterizing device has a processor for executing a parameterizing program with which the at least one allocation parameter can be generated, and wherein the parameterizing device has a communication interface for sending the at least one allocation parameter.

18. The machine tool according to claim 1, wherein the parameterizing interface comprises or is represented by a wired and/or wireless communication interface and/or a near field communication interface and/or a mobile radio interface and/or a WLAN interface.

19. The machine tool according to claim 1, wherein the parameterizing interface comprises a data interface to an electric energy storage device for receiving the at least one allocation parameter from the electric energy storage device.

20. The machine tool according to claim 19, wherein the energy storage device has an operating interface and/or a wireless communication interface and/or a near field communication interface (NFC interface) and/or a mobile radio interface and/or a WLAN interface, for detecting the at least one allocation parameter.

21. The machine tool according to claim 1, wherein the at least one actuation function has an actuation characteristic for actuating the at least one electric function unit which cannot be changed by an operator or which can, in addition to the parameterization using the at least one allocation parameter, be parameterized via the parameterizing interface and/or adapted for an operation of the machine tool to an operating situation of the machine tool by means of a learning function.

22. The machine tool according to claim 1, wherein the at least one allocation parameter can only be parameterized at a standstill of the drive motor.

23. The machine tool according to claim 1, wherein at least one operating element position of the at least one operating element or the at least one operating element can be deactivated via the parameterizing interface, so that the control device, if the operating element is moved into the at least one operating element position, or at any operation of the operating element, does not execute any actuation function.

24. A machine tool comprising:

a pistol-shaped housing having a pistol grip handle for gripping by an operator of the machine tool;

a tool holder for holding a work tool;

a drive motor for driving the tool holder;

a control device for actuating the drive motor to move in a clockwise direction or a counter-clockwise direction depending on the actuation by the control device of a first actuation function or a second actuation function;

a pressable switch disposed on the grip handle for controlling the direction of rotation of the drive motor, the switch being movable by an operator of the machine tool between a first operating element position and a second operating element position to actuate the control device; and a parameterizing interface for receiving instructions from a device external to the machine tool to assign one of the first or second operating element position to the first actuation function and to assign the other of the first or second operating element position to the second actuation function, such that, when the pressable switch is moved into the one of the first or second operating element position assigned to the first actuation function, the control device actuates the drive motor to move in the clockwise direction using the first actuation function, and when the pressable switch is moved into the other of the first or second operating element position assigned to the second actuation function, the control device actuates the drive motor to move in the counter-clockwise direction using the second actuation function, wherein the pressable switch projects outwardly from a first side of the pistol-shaped housing of the machine tool in the first operating element position in front of and projects outwardly form a second side of the pistol-shaped housing opposite to the first side in the second operating element position, and wherein the pressable switch is operable with fingers of a hand gripping the pistol grip handle.

* * * * *